Patented July 26, 1938

2,125,237

UNITED STATES PATENT OFFICE 2,125,237

PAINT

Otto F. Gargen and Carl J. Ernst, Milwaukee, Wis.

No Drawing. Application May 20, 1938, Serial No. 209,081

9 Claims. (Cl. 134—39)

This invention relates to paints and more particularly to a paint which is adapted to be polished by the application of friction after the paint has taken an initial set, and is a continuation in part of application Serial No. 161,238, filed August 27, 1937.

One object of the present invention is to produce a paint which may be polished by the application of friction thereto after the paint has taken an initial set.

Another object of the invention is to produce a paint suitable for use in connection with the method described in the United States patent to Carl J. Ernst, No. 2,082,050, patented June 1, 1937.

A further object of the invention is to produce a paint having an initial set, at which time it can be polished, and a final set, after which no further polishing can be done.

Another object is to produce a paint which can be washed readily.

A further object is to produce a paint on which a design can be effected by polishing and which can be washed or scrubbed without removing the design.

A further object of the invention is to produce a paint which is readily workable and which will have sufficient body to leave a heavy coat on the painted surface.

A further object is to produce a heavy flat paint which can be polished readily to give a semi-gloss after the paint has dried to a point where it has lost its sheen.

A paint embodying the invention is hereinafter set forth. Such paint contains the following ingredients in the proportion, by weight, as specified thereafter, which ingredients and proportions thereof may be varied.

| | Percent |
|---|---|
| Lithopone | 61.5 |
| Aluminum silicate | 8.8 |
| Beeswax | .4 |
| Flatting varnish | 20.1 |
| Linseed oil (cooked) | 9.2 |
| | 100.0 |

The lithopone (a coalescent precipitate of ZnS and $BaSO_4$) and the aluminum silicate ($AlSiO_3$) together form the pigment of the paint. The lithopone is a rather heavy pigment giving a hard, relatively thin coat. Since it is desirable to have the coat of paint fairly thick, and still not have the paint too heavy, a relatively light pigment such as aluminum silicate is added. The aluminum silicate acts as a fluffing agent or in other words, it increases the thickness of the coat without materially increasing the weight of the paint.

While lithopone and aluminum silicate have been found to produce an excellent paint, they may be replaced with other well known opaque pigments. For example, the lithopone may be replaced with white lead or titanium oxide and the aluminum silicate can be replaced with talc $H_2Mg_3(SiO_3)_4$, silicon di-oxide ($SiO_2$), or calcium carbonate ($CaCO_3$).

The proportion of the two pigments may be varied to decrease the lithopone and increase the aluminum silicate, higher percentages of the aluminum silicate in proportion to the lithopone giving a paint which will leave a correspondingly thicker coat. The percentage of pigment in the paint may vary between 55% and 80% depending on the materials used and the drying conditions required.

The wax which may be vegetable or animal wax, preferably beeswax may be either bleached or natural, and the quantity given represents substantially the maximum quantity which can be used without giving a waxy or greasy finish which would retard drying and be difficult to repaint. The wax improves the washability of the painted surface and gives a surface which can be washed without disturbing the design.

The vehicle of the paint comprises flatting varnish and heat treated linseed oil. Like the pigments, the relative quantities of oil and flatting varnish may be varied. The oil may be varied from 5 to 12 percent and the varnish correspondingly varied from 25 to 15 percent. Varying the proportion of oil and varnish varies the degree of polish obtained by brushing or rubbing.

By flatting varnish is meant a varnish which dries to a uniform dullness. Such a varnish may be composed of 10% soya oil, 10% tung oil, 15% East India gum, and 65% mineral spirits.

The oil used is prepared by heating a raw linseed oil to a temperature of 500 to 600° F., maintaining it at that temperature for a short period and allowing the oil to cool gradually.

The above formula gives a very thick white paint to which color must be added to obtain the desired shade. Also the paint must be thinned by adding one to two pints of turpentine or other volatile solvent to a gallon of paint. The amount of turpentine added depends upon the surface to be coated as well as the drying conditions desired.

Paints other than white may be made directly by using a suitable colored organic or inorganic pigment, such as iron oxide ($Fe_2O_3$), para reds, chrome yellow ($PbCrO_4$), yellow or blue lakes, etc., the essential condition being the covering property of the pigment and its ability to leave a thick coating of paint on the painted surface.

The above described paint when properly mixed gives a paint having good covering qualities and one which may be polished from a flat surface to a semi-gloss by rubbing or brushing, after the paint has dried to a point at which it has lost its sheen. After thoroughly hardening, the paint can be washed or scrubbed without further polishing. This process is more fully set forth in the aforesaid patent to Carl J. Ernst, No. 2,082,050.

Having thus described the invention and the method of producing the same, it is realized that the formula is susceptible to changes within relatively wide ranges. It is not, therefore, desired to restrict the invention to the precise materials and percentages specified, but only by the scope of the appended claims.

The invention set forth in the foregoing specification is hereby claimed as follows:

1. A paint, which can be polished readily to give a semi-gloss after the paint has dried to a point where it has lost its sheen, comprising the following ingredients in the proportions indicated:

| | Per cent |
|---|---|
| A mixture of pigments including a light fluffing agent exemplified by the class consisting of $AlSiO_3$, $H_2Mg_3(SiO_3)_4$, $SiO_2$ and $CaCO_3$ | 55–80 |
| Flatting varnish | 15–25 |
| Cooked linseed oil | 5–12 |
| A wax of the class of animal or vegetable waxes, not over | 0.5 |

2. A paint, which can be polished readily to give a semi-gloss after the paint has dried to a point where it has lost its sheen, comprising the following ingredients in the proportions indicated:

| | Per cent |
|---|---|
| Heavy pigment | 50–60 |
| A light fluffing agent exemplified by the class consisting of $AlSiO_3$, $H_2Mg_3(SiO_3)_4$, $SiO_2$ and $CaCO_3$ | 5–20 |
| Cooked linseed oil | 5–12 |
| Flatting varnish | 15–25 |
| A wax of the class of animal or vegetable waxes, not over | 0.5 |

3. A paint, which can be polished readily to give a semi-gloss after the paint has dried to a point where it has lost its sheen, comprising the following ingredients in the proportions indicated:

| | Per cent |
|---|---|
| Lithopone | 50–60 |
| A light fluffing agent exemplified by the class consisting of $AlSiO_3$, $H_2Mg_3(SiO_3)_4$, $SiO_2$ and $CaCO_3$ | 5–20 |
| Cooked linseed oil | 5–12 |
| Flatting varnish | 15–25 |
| A wax of the class of animal or vegetable waxes, not over | 0.5 |

4. A paint, which can be polished readily to give a semi-gloss after the paint has dried to a point where it has lost its sheen, comprising the following ingredients in the proportions indicated:

| | Per cent |
|---|---|
| Lithopone | 50–60 |
| Aluminum silicate | 5–20 |
| Cooked linseed oil | 5–12 |
| Flatting varnish | 15–25 |
| A wax of the class of animal or vegetable waxes, not over | 0.5 |

5. A paint, which can be polished readily to give a semi-gloss after the paint has dried to a point where it has lost its sheen, comprising the following ingredients in the proportions indicated:

| | Per cent |
|---|---|
| A mixture of pigments including a light fluffing agent exemplified by the class consisting of $AlSiO_3$, $H_2Mg_3(SiO_3)_4$, $SiO_2$ and $CaCO_3$ | 55–80 |
| Flatting varnish | 15–25 |
| Cooked linseed oil | 5–12 |
| Beeswax, not over | 0.5 |

6. A paint, which can be polished readily to give a semi-gloss after the paint has dried to a point where it has lost its sheen, comprising the following ingredients in the proportions indicated:

| | Per cent |
|---|---|
| Heavy pigment | 50–60 |
| A light fluffing agent exemplified by the class consisting of $AlSiO_3$, $H_2Mg_3(SiO_3)_4$, $SiO_2$ and $CaCO_3$ | 5–20 |
| Cooked linseed oil | 5–12 |
| Flatting varnish | 15–25 |
| Beeswax, not over | 0.5 |

7. A paint, which can be polished readily to give a semi-gloss after the paint has dried to a point where it has lost its sheen, comprising the following ingredients in the proportions indicated:

| | Per cent |
|---|---|
| Lithopone | 50–60 |
| A light fluffing agent exemplified by the class consisting of $AlSiO_3$, $H_2Mg_3(SiO_3)_4$, $SiO_2$ and $CaCO_3$ | 5–20 |
| Cooked linseed oil | 5–12 |
| Flatting varnish | 15–25 |
| Beeswax, not over | 0.5 |

8. A paint, which can be polished readily to give a semi-gloss after the paint has dried to a point where it has lost its sheen, comprising the following ingredients in the proportions indicated:

| | Per cent |
|---|---|
| Lithopone | 50–60 |
| Aluminum silicate | 5–20 |
| Cooked linseed oil | 5–12 |
| Flatting varnish | 15–25 |
| Beeswax, not over | 0.5 |

9. A paint, which can be polished readily to give a semi-gloss after the paint has dried to a point where it has lost its sheen, comprising the following ingredients in approximately the percentages indicated:

| | Per cent |
|---|---|
| Lithopone | 61.5 |
| Aluminum silicate | 8.8 |
| Cooked linseed oil | 9.2 |
| Flatting varnish | 20.1 |
| Beeswax | 0.4 |

OTTO F. GARGEN.
CARL J. ERNST.